(12) United States Patent
Bailey et al.

(10) Patent No.: US 11,290,563 B2
(45) Date of Patent: Mar. 29, 2022

(54) SOCIAL NETWORK MAPS

(71) Applicant: Facebook, Inc., Menlo Park, CA (US)

(72) Inventors: William Samuel Bailey, San Francisco, CA (US); Jessica S Liang, Bedford, NY (US)

(73) Assignee: Meta Platforms, Inc., Menlo Park, CA (US)

(*) Notice: Subject to any disclaimer, the term of this patent is extended or adjusted under 35 U.S.C. 154(b) by 0 days.

(21) Appl. No.: 17/153,330

(22) Filed: Jan. 20, 2021

(65) Prior Publication Data

US 2022/0070273 A1 Mar. 3, 2022

Related U.S. Application Data

(60) Provisional application No. 63/071,931, filed on Aug. 28, 2020.

(51) Int. Cl.
| | |
|---|---|
| *G06F 15/16* | (2006.01) |
| *H04L 67/306* | (2022.01) |
| *G06Q 50/00* | (2012.01) |
| *H04L 67/52* | (2022.01) |

(52) U.S. Cl.
CPC ........... *H04L 67/306* (2013.01); *G06Q 50/01* (2013.01); *H04L 67/18* (2013.01)

(58) Field of Classification Search
CPC ....... H04L 67/18; H04L 67/306; H04L 51/32; H04L 51/20; H04W 4/21; H04W 4/02; G06Q 50/01; G06Q 30/0259; G06Q 30/0205; G06Q 30/0261
USPC ................................................ 709/217, 219
See application file for complete search history.

(56) References Cited

U.S. PATENT DOCUMENTS

2015/0301579 A1* 10/2015 Vaccari .................. H04W 4/20 713/340
2020/0120097 A1* 4/2020 Amitay ................... G06F 16/29

* cited by examiner

*Primary Examiner* — Razu A Miah
*Assistant Examiner* — Andrew Woo
(74) *Attorney, Agent, or Firm* — Lee & Hayes, P.C.

(57) ABSTRACT

Techniques for providing social network maps are described. For example, a social networking system may receive, from a first user account associated with the social networking system, a text input associated with a multi-author story. In some examples, the social networking system then selects a feed post associated with the multi-author story previously shared by a second user account associated with the social networking system. The social networking system then generates an interactive map which comprises a visual representation of the feed post, and provides the interactive map comprising the visual representation to the first user account.

20 Claims, 7 Drawing Sheets

SOCIAL NETWORK MAPS

CROSS-REFERENCE TO RELATED APPLICATIONS

This application claims the benefit of priority to U.S. Provisional Application No. 63/071,931, filed Aug. 28, 2020, which is incorporated herein by reference in its entirety.

BACKGROUND

Social networking systems allow users to connect and interact with one another by sharing events, content such as photos and videos, and interests. Users are continually searching for ways to find new locations and experiences and share these experiences and locations wither others. Therefore, social networking systems continue to provide users with increasing options for finding new locations and experiences that allow users to connect with one another.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
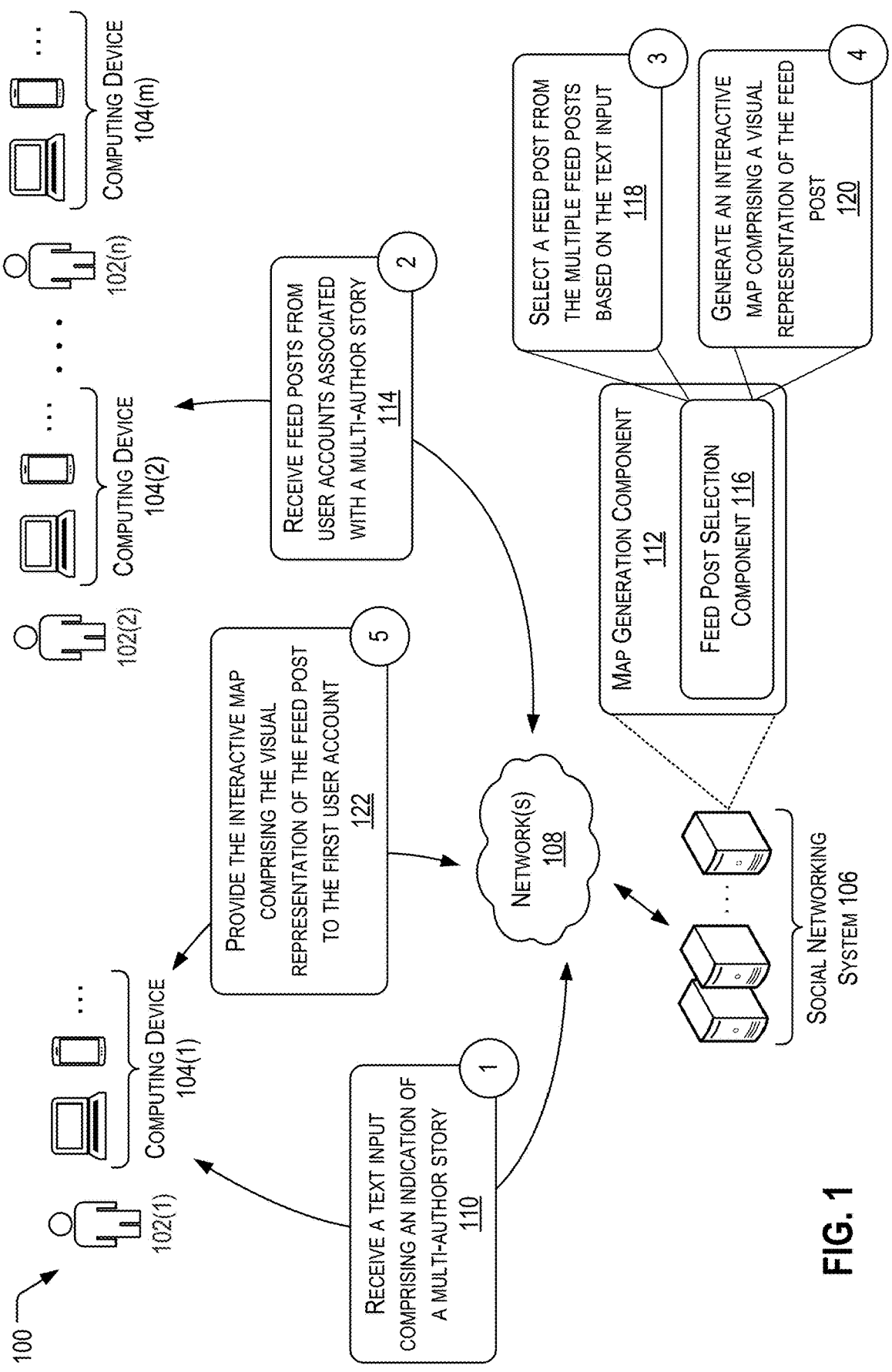
FIG. 1 is a schematic view of an example system usable to implement example techniques for social network maps described herein.

While conventional location service applications and devices can provide users with maps of places around the users, directions to specific addresses, and the like, they are not without limitations. In some cases, a user may know a type of location that the user wants to visit (e.g., a coffee shop), but may not know what specific location they want to visit. As discussed above, social networking systems continue to develop fun and unique ways for users to connect with each other and share experiences. By sharing photos and videos with followers on social media, users may provide an insight to places they have seen, visited, and experienced to encourage others to visit (or discourage them from visiting). Thus, the described techniques provide functionality beyond what is provided in conventional map applications by showing users feed posts associated with places that the users are more likely to trust. For example, the described techniques provide an interactive map that is populated with feed posts at tagged locations and may be shared by accounts that a user follows on the social networking system. Thus, the user may be encouraged to go to those locations based on the trusted reputation formed by the user via the social networking system with users of the other user accounts.

This application describes techniques for providing social network maps via a social networking system and/or service (herein referred to as a "social networking system"). As described in more detail below, a map provided by the social networking system provides an insight to area attractions based on a user's social network and/or a request to view specific items on the map, and encourages users to share their favorite places with one another.

For instance, in one example, a social networking system may operate a service that corresponds to a dedicated application installed on a user device. The social networking system may enable users to share content via the application installed on the user device. In some cases, the shared content may be accessed (e.g., viewed) by devices associated with other users that also have the application installed on their respective devices. Alternatively or additionally, the social networking system may enable users to share content, and/or access (e.g., view) content shared by other user accounts, via a web-based application accessed via a web browser. The social networking system may store account information associated with each user and the respective device on which the application is installed.

In some examples, the social networking system may receive, from a first user account associated with the social networking system, a text input associated with a multi-author story. The multi-author story may comprise content items (e.g., submitted by multiple user accounts) that have a common feature, such as a hashtag, sticker, or other indicator as described herein. In some cases, the text input may indicate a relation to a multi-author story, such as by the inclusion of a hashtag ("#") in the text input. Examples are also considered in which an indicator of a multi-author story, such as a hashtag, is omitted from the text input, but the social networking system uses the text included in the text input as a search term for a multi-author story. In some examples, the social networking system then selects a feed post associated with the multi-author story previously shared by a second user account associated with the social networking system. In some examples, the feed post is persistent (e.g., non-ephemeral) and, once shared by the second user account, populates feeds of user accounts that follow the second user account on the social networking system. The social networking system then generates an interactive map which comprises a visual representation of the feed post, and provides the interactive map comprising the visual representation of the feed post to the first user account. In some cases, the interactive map allows the user to view the location of a device associated with the user account relative to location tagged in the feed post, select the feed post to view additional details associated with the feed post, scroll on the map, zoom in, and zoom out, to name a few examples.

In some examples, the social networking system determines that the text input comprises a geolocation (e.g., an address, a town, a state, a country, geographic coordinates, etc.). When the social networking system generates the interactive map, the interactive map may display at least a portion of the geolocation on the interactive map.

In some examples, the social networking system may determine that the text input comprises a topic. The topic may be a service (e.g., a restaurant, a gas station, a nail salon, a food truck, etc.); an attraction (e.g., a park, a museum, a theme park, a beach, etc.); or an item (e.g., coffee, donuts, ice cream, Thai food, etc.); to name a few examples.

In some examples, the social networking system may determine a location of a device associated with the first user account. In some cases, the social networking system may determine that the location tagged in the feed post is within a threshold distance (e.g. 1 mile, 5 miles, 10 miles, etc.) of the location of the device, where interactive map may be limited to include visual representations of posts within the threshold distance. In this way, the interactive map includes feed posts previously shared by user accounts that the user follows within a threshold distance of the user and associated with a desired topic, where the threshold distance may correspond to a distance that the user may travel to in a certain amount of time (e.g., a 10-minute walk, a 20-minute drive, etc.).

In some examples, the feed post may be a first feed post associated with the multi-author story, and the interactive map may include a thumbnail of the feed post and/or the multi-author story. For instance, the interactive map may display a small image of a feed post, an image, a symbol, or other visual representation associated with the multi-author story, in the thumbnail. In some examples, a selection of the thumbnail of the feed post displays the first feed post and a second feed post associated with the multi-author story. Thus, once the user selects the thumbnail on the map, the user may view additional feed posts associated with the multi-author story.

In some examples, the first feed post and the second feed post are displayed based on a popularity of the individual feed posts relative to one another and/or a recency that the individual feed posts are shared. Popularity, for example, may be based on a number of "likes" and/or comments the feed post has, where the multiple feed posts may be displayed in order of descending number of "likes" and/or comments. Additionally or alternatively, recency may be based on a time that the feed post was shared, where the most recent posts may be displayed first.

In some examples, the social networking system may determine that the first user account is a "follower" of the second user account on the social networking system. In some cases, the social networking system may select the feed post to display on the interactive map based in part on the first user account following the second user account. In this way, the social networking system may prioritize feed posts to display on the interactive map that the first user is interested in, based on accounts that the first user chooses to follow.

In some examples, the text input is a first text input and the multi-author story is a first multi-author story. In some cases, the social networking system may receive a second text input associated with a second multi-author story. The social networking system may, in some examples, select the feed post to include on the interactive map based at least in part on the feed post being associated with both the first multi-author story and the second multi-author story. In some examples, the first text input is different from the second text input, and the first multi-author story is different than the second multi-author story. Thus, the user may narrow the feed posts included on the interactive map based in part on multiple search terms, allowing for more specific results curated to the user's interests.

In some examples, the social networking system determines that a first user account associated with a social networking system follows a second user account on the social networking system. The social networking system selects a feed post associated with a multi-author story previously shared by the second user account. The social networking system may further generate an interactive map comprising a visual representation of the feed post, and provide the interactive map comprising the visual representation of the feed post to the first user account. In this way, the social networking system may populate the interactive map with visual representations of feed posts that the first user is interested in, based on accounts that the first user chooses to follow, even without a search for a particular place and/or topic.

In some examples, the feed post is one of multiple feed posts. The social networking system may further generate a list of the multiple feed posts. In some cases, the social networking system may provide the list of the multiple feed posts to the first user. The list may include information about the locations included in the feed posts in a way that may be easier for the user to consume than in the interactive map view.

In some examples, the social networking system may further determine a location of a device associated with the first user account. The social networking system may determine that the location tagged in the feed post is within a threshold distance of the location of the device, where interactive map may be limited to include posts within the threshold distance. In this way, the interactive map includes feed posts within a threshold distance of the user, where the threshold distance may correspond to a distance that the user may travel to in a certain amount of time (e.g., a 10-minute walk, a 20-minute drive, etc.). Thus, the social networking system may provide feed posts that the user may travel to within a reasonable amount of time.

In some examples, the feed post may be one of multiple feed posts, and the list of feed posts provided to the user may include at least one of hours of operation of a business associated with the location, a category of service provided, an open or closed status, and/or an average price of products or services offered by respective locations tagged in the multiple feed posts.

In this way, the social networking system may populate a map with places that a user may want to visit based in part on locations shared by user accounts that the user follows on the social networking system. By displaying these locations, the techniques described in this application provide improvements to current techniques by providing users the opportunity to decide where to visit based on the experiences of others they may know and trust. Additionally, the techniques described herein improve performance of one or more computing devices by reducing the amount of content sent over a network. For instance, by selecting a feed post associated with a multi-author story and providing a user an interactive map comprising the feed post, the social networking system can reduce the amount of content transferred between the social networking system and a location service system.

These and other aspects are described further below with reference to the accompanying drawings. The drawings are merely example implementations and should not be construed to limit the scope of the claims. For example, while examples are illustrated in the context of a user interface for a mobile device, the techniques may be implemented using any computing device and the user interface may be adapted to the size, shape, and configuration of the particular computing device.

Example System Architecture

FIG. 1 is a schematic view of an example computing system 100 usable to implement example techniques described herein to facilitate social network collections on an application via the system 100. In some examples, the system 100 may include users 102(1), 102(2), . . . 102(n) (collectively "users 102") to interact using computing devices 104(1), 104(2), . . . 104(m) (collectively "computing devices 104") with a social networking system 106 via a network 108. In this example, n and m are non-zero integers greater than 1.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the social networking system 106 and/or communicate with one another.

The social networking system 106 may include one or more servers or other computing devices, any or all of which may include one or more processors and memory storing computer executable instructions to implement the functionality discussed herein attributable to the social networking system or digital platform. The social networking system 106 may enable its users 102 (such as persons or organizations) to interact with the social networking system 106 and with each other via the computing devices 104. The social networking system 106 may, with input from a user, create and store in the social networking system 106 a user account associated with the user. The user account may include demographic information, communication-channel information, financial information and information on personal interests of the user. The social networking system 106 may also, with input from a user, create and store a record of relationships of the user with other users of the social networking system, as well as provide services (e.g., posts, comments, photo-sharing, messaging, tagging, mentioning of other users or entities, games, etc.) to facilitate social interaction between or among the users 102.

The social networking system 106 may be configured to generate a map comprising visual representations of feed posts shared by the users 102 via the computing devices 104 on the social networking system 106.

For example, at operation 110 (indicated by "1"), a map generation component 112 of the social networking system 106 may receive a text input associated with a multi-author story. In some examples, the map generation component 112 may be part of a social network service (e.g., Facebook®, Instagram®, etc.), although other examples of services are also considered. In some examples, the multi-author story may comprise content items (e.g., submitted by multiple user accounts) that have a common feature, such as a hashtag, sticker, or other indicator. In some cases, the text input may be received from a first user 102(1) associated with the computing device 104(1). The text input may include one or more indications of a multi-author story, such as a hashtag, search term, or location, to name a few examples. For example, the first user 102(1) may use a digital keyboard of the computing device 104(1) to enter the input. Additionally or alternatively, the first user 102(1) may enter a speech input, which may be translated to a text input by a speech-to-text translation component of the computing device 104(1) (not pictured).

At operation 114 (indicated by "2"), a feed post selection component 116 of the map generation component 112 receives one or more feed posts from user account(s) associated with a multi-author story. For instance, a second user 102(2) may share a feed post via the social networking system 106. The social networking system 106 may cause the feed post to appear in a feed of a first user 102(1) in response to the social networking system 106 determining that the first user 102(1) follows the user account associated with the second user 102(2). Additionally or alternatively, the social networking system 106 may provide the content post in an explore page, as part of a search, as part of a multi-author story and the like, such as to a user account associated with a user 102(n) who may not follow the user account associated with the user 102(2). Responsive to receiving feed posts from user accounts, the feed post selection component 116 may determine that the feed posts are associated with the multi-author story based at least in part on the common feature being included in the feed post(s).

At operation 118 (indicated by "3"), the feed post selection component 116 selects a feed post from the multiple feed posts based on the text input. In some examples, the feed post selection component 116 may select the feed from the multiple feed posts based on popularity, where popularity may be based on the number of "likes" and/or a number of comments the feed post has received. Additionally or alternatively, the feed post selection component 116 may select feed posts based on a recency of the post, where recency may be based on the time and/or date that the feed post is shared by a user 102 on the social networking system 106.

In some examples, the map generation component 112 may receive more than one text input from the first user 102(1), where the additional text input(s) comprise indications of one or more different multi-author stories than the first multi-author story associated with the first text input. In some cases, the feed post selection component 116 may receive feed posts from user accounts associated with the both the first multi-author story and any additional multi-author stories associated with the multiple text inputs. The feed post selection component 116 may select a feed post from the multiple feed posts based on the feed post being associated with both the first multi-author story and the additional multi-author stories indicated in the text input, along with factors described herein such as location relative to the device 104(1), popularity, recency, and the like. As an illustrative example, the first user 102(1) may enter a text input comprising "#burger #milkshake" in search for a location that serves both burgers and milkshakes. In response, the feed post selection component 116 may populate the interactive map with feed posts that include both the "#burger" and "#milkshake" common features. In this way, the user 102(1) may narrow the feed posts included on the interactive map by inputting multiple search terms for the text input, further tailoring the results to the user's 102(1) preferences.

At operation 120 (indicated by "4"), the map generation component 112 generates an interactive map comprising a visual representation of the feed post. In some examples, the interactive map may display the visual representation of the feed post at a tagged location associated with the feed post. For instance, if the feed post includes a tagged location at a coffee shop, the map generation component may display the visual representation of the feed post on the interactive map at (or near) the location of the coffee shop on the map. In some examples, the map generation component 112 may determine that an account of the first user 102(1) follows an account of the second user 102(2) on the social networking system 106. The map generation component 112 may populate the map with one or more visual representations of feed posts shared by the second user account 102(2), allowing the first user 102(1) to view feed posts shared by accounts the first user 102(1) follows.

In some cases, a feed post may include a common feature associated with a geolocation, alternatively or in addition to a tagged location of the feed post. For example, a feed post may not include a location tag, but may include an indicator of a multi-author story such as "#Hawaii". Responsive to determining that the feed post is associated with a multi-author story comprising a geolocation, the map generation component 112 may present the visual representation of the feed post on the interactive map at or near that geolocation. A geolocation may include the name of a specific location, such as the name of a business, a restaurant, a park, or an attraction, to name a few examples. A geolocation may alternatively or additionally include the name of a specific geographic location, such as a city, state, or country. As an illustrative example, the feed post may be associated with the multi-author story "#SeattleSpaceNeedle". The map generation component 112 may present the visual representation of the feed post on the interactive map at or near the Space Needle in Seattle.

In some cases, the map generation component 112 may include a portion of the geolocation on the interactive map, rather than an entirety of the geolocation. Responsive to determining the geolocation included in the text input, the map generation component 112 may display the geolocation on the map such that a portion of the total area of the geolocation is displayed (e.g., 10%, 20%, 30%, etc.). For example, the user 102(1) may input "#Texas" as the text input in the operation 110. The map generation component 112 may display a portion of Texas on the interactive map, such as an area surrounding the capital of Texas, an area surrounding a location of the device 104(1) if the user 102(1) is located in Texas at the time of the search, and so forth.

Additionally or alternatively, the map generation component 112 may determine that the text input includes a topic, such as a service, an attraction, or an item, to name a few examples. In some cases, the feed post selection component 116 may determine a multi-author story associated with the topic and determine feed posts associated with the multi-author story. Responsive to determining the feed posts associated with the multi-author story, the social networking system 106 may determine tagged locations of the respective feed posts associated with multi-author story. In some examples, the social networking system 106 may determine a location of the computing device 104(1) associated with the first user 102(1). The feed selection component 116 may determine which of the feed posts are within a threshold distance (e.g. 1 mile, 5 miles, 10 miles, etc.) of the location of the computing device 104(1). In some cases, the map generation component 112 may populate the interactive map with one or more visual representations of feed posts that are within the threshold distance of the device 104(1), and thus within the threshold distance of the user 102(1).

As an illustrative example, the user 102(1) may enter a text input including "#shaveice". The map generation component 112 may determine that "#shaveice" is topic, may determine a multi-author story associated with "#shaveice", and may determine feed posts having the common feature "#shaveice" and thus associated with the multi-author story. Upon determining which of the feed posts are within a threshold distance of the user 102(1), the map generation component 112 may present to the interactive map to the user 102(1) that includes nearby locations that serve shave ice.

At operation 122 (indicated by "5"), the map generation component 112 provides the interactive map comprising the visual representation of the feed post to the account of the first user 102(1). For instance, providing the interactive map may include displaying the visual representation of the feed post on the interactive map, where the first user 102(1) can access the feed post. The interactive map may, in some examples, display a thumbnail of the feed post, and/or an image or symbol representation associated with the multi-author story to give the first user 102(1) a preview of what is included in the feed post and/or the multi-author story. Responsive to the first user 102(1) selecting the thumbnail of the feed post (e.g., via a touch input), the map generation component 112 may provide the feed post shared by the second user 102(2) to be viewed by the first user 102(1).

In some examples, the interactive map may include multiple visual representations of feed posts associated with the multi-author story. In some cases, the multiple feed posts may be concentrated in one area, making individual feed posts difficult to view and/or select on the interactive map. For example, the first user 102(1) may zoom out of the interactive map such that multiple thumbnails representing the multiple feed posts are located in or around the same area. Thus, the interactive map may display a combined thumbnail which may include a number indicating a total number of feed posts located at or near the area. In response to the first user 102(1) selecting the combined thumbnail, the map generation component 112 may provide a list of the multiple feed posts. In some examples, the feed posts may be displayed in the list in order of popularity and/or recency, similar to the description above.

Alternatively or additionally, the map generation component 112 may provide one or more visual representations of feed posts on an interactive map absent a text input from the first user 102(1) described in relation to the operation 110. The map generation component 112 may, in some examples, present the interactive map to the first user 102(1) with suggested locations based in part on nearby tagged locations of feed posts shared by other users 102(2)-102(n) that the first user 102(1) follows on the social networking system 106. For example, the social networking system 106 may determine the location of the first user 102(1) associated with the computing device 104(1) and may determine that the account of the first user 102(1) follows the account of the second user 102(2). In some examples, the feed post selection component 116 may determine which of the feed posts shared by the second user 102(2) are within a threshold distance (e.g., 1 mile, 5 miles, 10 miles, etc.) of the current location of the computing device 104(1), and may select one or more feed posts previously shared by the second user 102(2) that are within the threshold distance to include visual representations of on the interactive map.

Similar to the discussion above, the feed post selection component 116 may select the feed posts to include on the interactive map absent a text input from the user 102(1) based at least in part on a popularity of the individual feed posts and/or a recency of the individual feed posts. Absent a text input from the first user 102(1), the map generation component 112 may populate the interactive map with the visual representations of the feed posts having the most likes within the threshold distance and within a threshold recency (e.g., the top 10% most popular feed posts within 2 miles of the computing device 104(1) and within the past 2 days), without filtering which feed posts to include based on multi-author stories included in the feed posts. In some cases, the map generation component 112 may limit the number of visual representations of feed posts displayed on the interactive map (e.g. 10 feed posts, 15 feed posts, 20 feed posts, etc.), thus providing the first user 102(1) with a manageable selection of feed posts to view.

In some examples, the map generation component 112 may generate a list of the feed posts displayed on the interactive map and may provide the list to the user 102(1). The list may include an hours of operation, a category of services provided, and open or closed status, and/or an average price for goods and/or services provided by the location tagged in each feed post presented to the user 102(1).

In some examples, the social networking system 106 may provide privacy features to the users 102 while interacting with the social networking system 106. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user 102(1) may share an object to the social networking system 106. The object may be associated with a concept node connected to a user node of the user 102(1) by an edge. The user 102(1) may specify privacy settings that apply to a particular edge connecting to the concept node of the object, or may specify privacy settings that apply to all edges connecting to the concept node. In some examples, the user 102(1) may share a set of objects of a particular object-type (e.g., a set of images). The user 102(1) may specify privacy settings with respect to all objects associated with the user 102(1) of that particular object-type as having a particular privacy setting (e.g., specifying that all images posted by the user 102(1) are visible only to friends of the user and/or users tagged in the images).

In particular examples, the social networking system 106 may present a "privacy wizard" (e.g., within a webpage, a module, one or more dialog boxes, or any other suitable interface) to the user 102(1) to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102(1) that may display, to the user 102(1), current privacy settings of the user 102(1). The dashboard functionality may be displayed to the user 102(1) at any appropriate time (e.g., following an input from the user 102(1) summoning the dashboard functionality, following the occurrence of a particular event or trigger action). The dashboard functionality may allow the user 102(1) to modify one or more of the user's current privacy settings at any time, in any suitable manner (e.g., redirecting the user 102(1) to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102(1) (or other entity) for a particular object stored in a data store, the social networking system 106 may send a request to the data store for the object. The request may identify the user 102(1) associated with the request and the object may be sent only to the user 102(1) (or a client system of the user) if the authorization server determines that the user 102(1) is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing system. As an example and not by way of limitation, the user 102(1) may view one or more other users 102(2) . . . 102(n) of an online social network through a "People You May Know" function of the online social network, or by viewing a list of friends of the user 102(1). As an example and not by way of limitation, the user 102(1) may specify that they do not wish to see objects associated with a particular other user (e.g., the user 102(2)) in their newsfeed or friends list. If the privacy settings for the object do not allow it to be surfaced to, discovered by, or visible to the user 102(1), the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102(1) may specify that the user's status updates are public, but any images shared by the user are visible only to the user's friends on the online social network. In some examples, the user 102(1) may specify different privacy settings for different types of entities, such as individual users, friends-of-friends, followers, user groups, or corporate entities. In some examples, the user 102(1) may specify a group of users that may view videos posted by the user 102(1), while keeping the videos from being visible to the user's employer. In particular examples, different privacy settings may be provided for different user groups or user demographics. As an example and not by way of limitation, the user 102(1) may specify that other users who attend the same university as the user 102(1) may view the user's pictures, but that other users who are family members of the user 102(1) may not view those same pictures.

In particular examples, the social networking system 106 may provide one or more default privacy settings for each object of a particular object-type. A privacy setting for an object that is set to a default may be changed by a user associated with that object. As an example and not by way of limitation, all images posted by the user 102(1) may have a default privacy setting of being visible only to friends of the first user and, for a particular image, the user 102(1) may change the privacy setting for the image to be visible to friends and friends-of-friends.

In particular examples, privacy settings may allow the user 102(1) to specify (e.g., by opting out, by not opting in) whether the social networking system 106 may receive, collect, log, or store particular objects or information associated with the user 102(1) for any purpose. In particular examples, privacy settings may allow the user 102(1) to specify whether particular applications or processes may access, store, or use particular objects or information associated with the user. The privacy settings may allow the user 102(1) to opt in or opt out of having objects or information accessed, stored, or used by specific applications or processes. The social networking system 106 may access such information in order to provide a particular function or service to the user 102(1), without the social networking system 106 having access to that information for any other purposes. Before accessing, storing, or using such objects or information, the social networking system 106 may prompt the user 102(1) to provide privacy settings specifying which applications or processes, if any, may access, store, or use the object or information prior to allowing any such action. As an example and not by way of limitation, the user 102(1) may transmit a message to the user 102(2) via an application related to the online social network (e.g., a messaging app), and may specify privacy settings that such messages should not be stored by the social networking system 106.

In particular examples, the user 102(1) may specify whether particular types of objects or information associated with the user 102(1) may be accessed, stored, or used by the social networking system 106. As an example and not by way of limitation, the user 102(1) may specify that images sent by the user 102(1) through the social networking system 106 may not be stored by the social networking system 106. In some examples, the user 102(1) may specify that messages sent from the user 102(1) to another user 102(2) may not be stored by the social networking system 106. In some cases, the user 102(1) may specify that all objects sent via a particular application may be saved by the social networking system 106.

In particular examples, privacy settings may allow the user 102(1) to specify whether particular objects or information associated with the user 102(1) may be accessed from particular client systems or third-party systems. The privacy settings may allow the user 102(1) to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102(1) may be prompted to specify a particular privacy setting for each context. As an example and not by way of limitation, the user 102(1) may utilize a location-services feature of the social networking system 106 to provide recommendations for restaurants or other places in proximity to the user 102(1). The default privacy settings of the user 102(1) may specify that the social networking system 106 may use location information provided from the computing device 104(1) of the user 102(1) to provide the location-based services, but that the social networking system 106 may not store the location information of the user 102(1) or provide it to any third-party system. The user 102(1) may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example and not by way of limitation, the user 102(1) may transmit a message to the user 102(2), and the social networking system 106 may temporarily store the message in a data store until the user 102(2) has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example and not by way of limitation, the user 102(1) may share a first image and specify that the first image is to be public to all other users. At a later time, the user 102(1) may specify that any images shared by the user 102(1) should be made visible only to a first user group. The social networking system 106 may determine that this privacy setting also applies to the first image and make the first image visible only to the first user group. In particular examples, the change in privacy settings may take effect only going forward. Continuing the example above, if the user 102(1) changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the social networking system 106 may determine that user 102(1) may want to change one or more privacy settings in response to a trigger action associated with the user 102(1). The trigger action may be any suitable action on the online social network. As an example and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102(1) to change the privacy settings regarding the visibility of objects associated with the user 102(1). The prompt may redirect the user 102(1) to a workflow process for editing privacy settings with respect to one or more entities associated with the trigger action. The privacy settings associated with the user 102(1) may be changed only in response to an explicit input from the user 102(1), and may not be changed without the approval of the user 102(1). As an example and not by way of limitation, the workflow process may include providing the user 102(1) with the current privacy settings with respect to the user 102(2) or to a group of users (e.g., un-tagging the user 102(1) or the user 102(2) from particular objects, changing the visibility of particular objects with respect to the user 102(2) or a group of users), and receiving an indication from the user 102(1) to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the social networking system 106 may send a reminder to the user to confirm his or her privacy settings every six months or after every ten photo posts. In particular examples, privacy settings may also allow users to control access to the objects or information on a per-request basis. As an example and not by way of limitation, the social networking system 106 may notify the user whenever a third-party system attempts to access information associated with the user, and require the user to provide verification that access should be allowed before proceeding.

Figure 2:
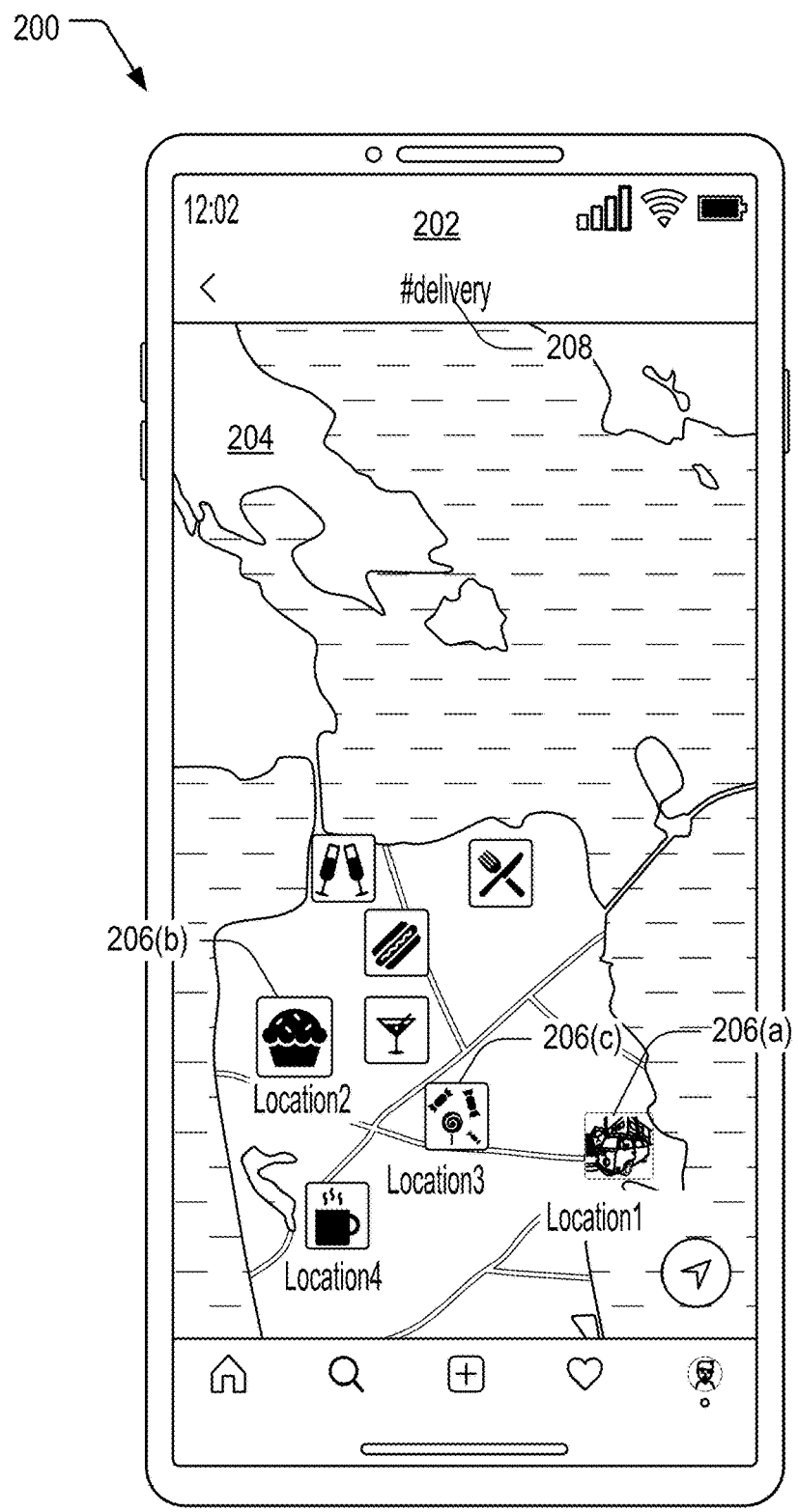
FIG. 2 illustrates an example user interface including an interactive map populated with feed posts using the techniques described herein.

FIG. 2 illustrates an example device 200 including a user interface 202. The user interface 202 may include an interactive map 204 populated with a feed post 206(*a*), a feed post 206(*b*), a feed post 206(*c*), and so on (collectively "feed posts 206") using the techniques described herein. While generally referred to as "feed posts," in the description of the user interfaces illustrated in FIGS. 2-5, the feed posts may be visual representations or thumbnails of the feed posts and/or multi-author story, as described above. The user interface 202 may include a common feature 208 ("#delivery"), which may correspond to a text input received from the user 102(1) to locate establishments that provide delivery services. Each of the feed posts 206 that are included on the interactive map 204 may include the common feature 208 to be included in a multi-author story associated with "#delivery", suggesting that the establishments at the locations of the feed posts 206 each provide delivery services.

Figure 3B:
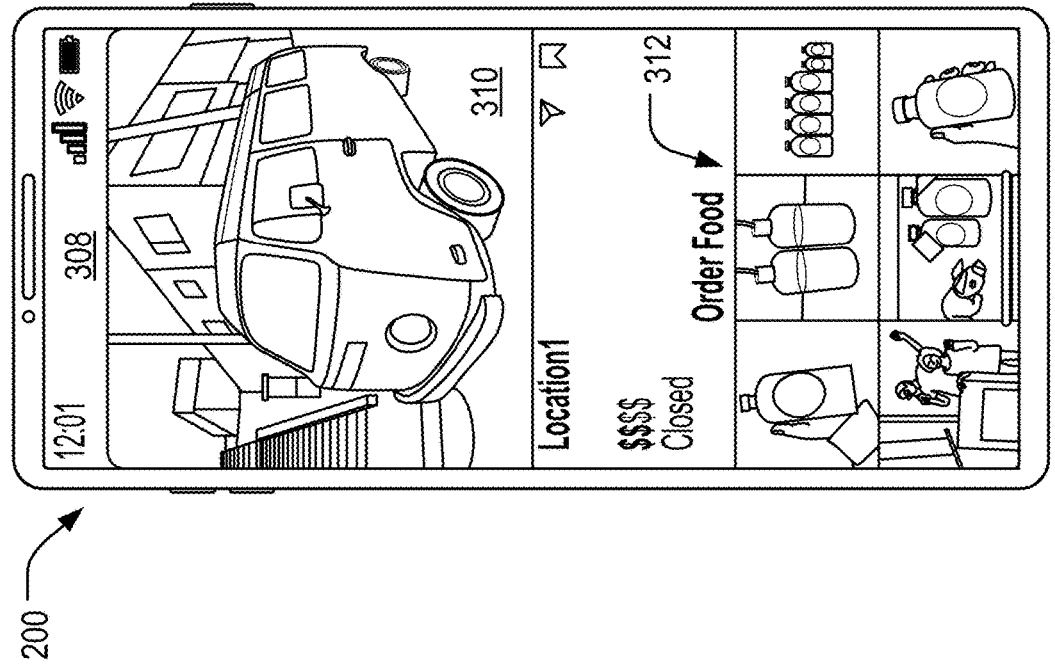
FIGS. 3A and 3B illustrate example user interfaces that provide details of a feed post selected from an interactive map using the techniques described herein.
Figure 3A:
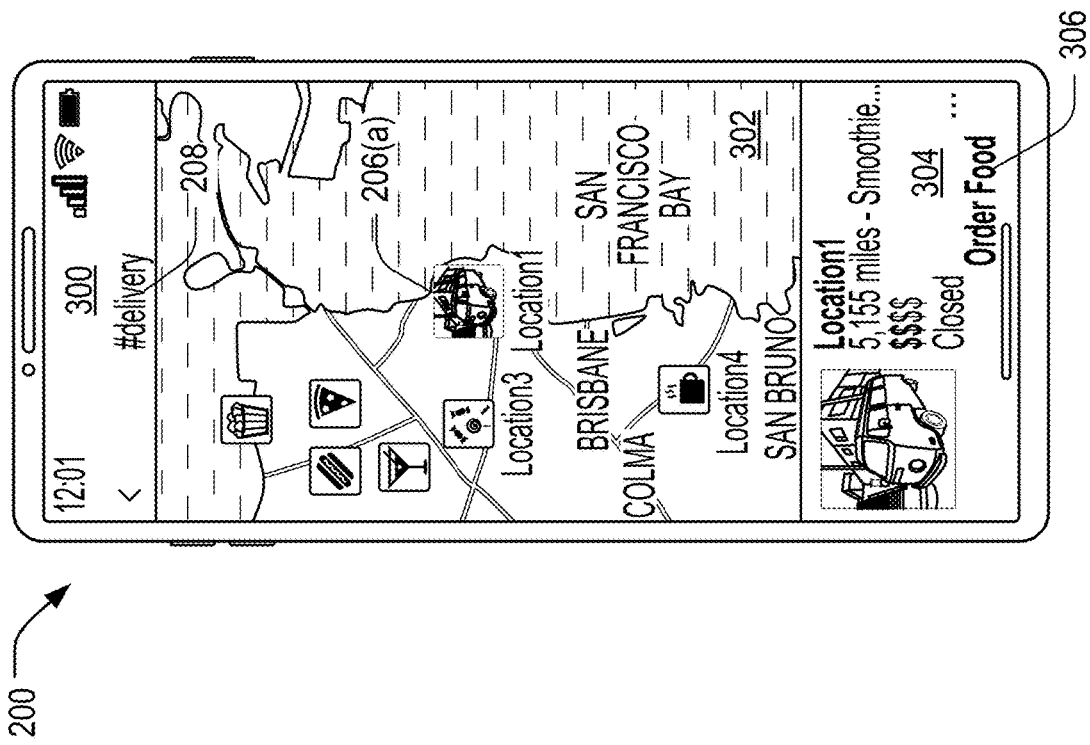

FIG. 3A illustrates the example device 200 including a user interface 300. Similar to FIG. 2, the user interface 300 may include the common feature 208 and the feed post 206(*a*) on an interactive map 302. The user interface 300 may also include a tab 304 that may provide details of the location tagged in the feed post 206(*a*). The tab 304 may be displayed in the user interface 300 in response to a selection of the feed post 206(*a*) on the interactive map 302. The tab 304 may include information such as a name of the establishment at the location tagged in the feed post 206(*a*), a distance from the example device 200 to the location tagged in the feed post 206(*a*), types of goods and/or services offered at the establishment, a price of goods and/or services offered by the establishment, whether the establishment is open or closed, and the like. In some cases, the tab 304 may provide a control 306 that, when selected, provides the user with options to order food from the establishment at the location of the feed post 206(*a*).

FIG. 3B illustrates the example device 200 including a user interface 308. In some examples, the user interface 308 may be presented in response to a selection a name of the establishment included in the tab 304 of the user interface 300. The user interface 308 may include an image 310 associated with the feed post 206(*a*), along with one or more other images 312 from other feed posts associated with the location included in the feed post 206(*a*). The other feed posts may have been shared on the social networking system 106 by different users than the user that shared the feed post 206(*a*). Therefore, the user 102(1) may view feed posts (e.g., by selecting one or more of the images 312) shared by users that the user 102(1) may not follow on the social networking system to obtain more information about the location in the feed post 206(*a*).

Figure 4C:
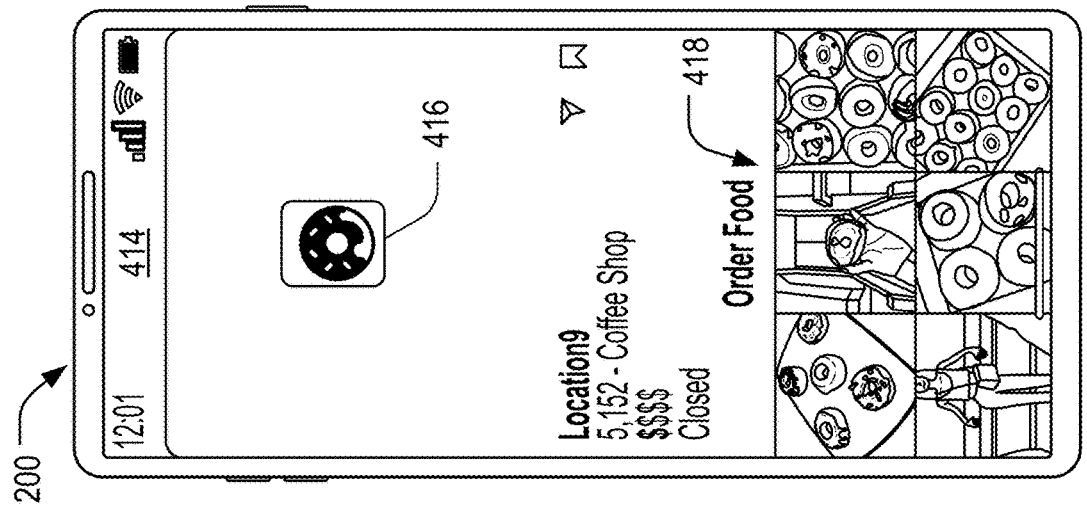
FIGS. 4A-4C illustrate example user interfaces that provide additional details of a feed post selected from an interactive map using the techniques described herein.
Figure 4B:
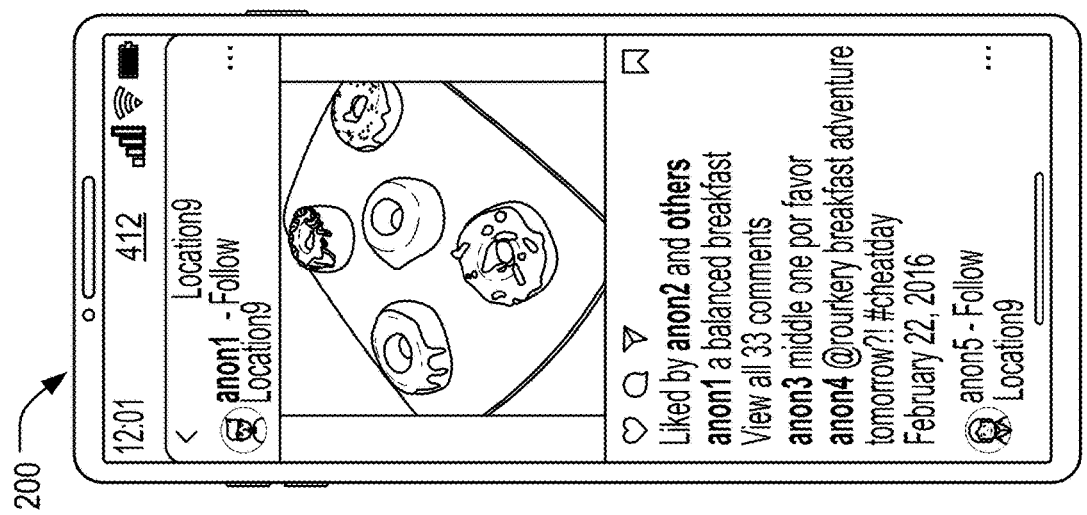
Figure 4A:
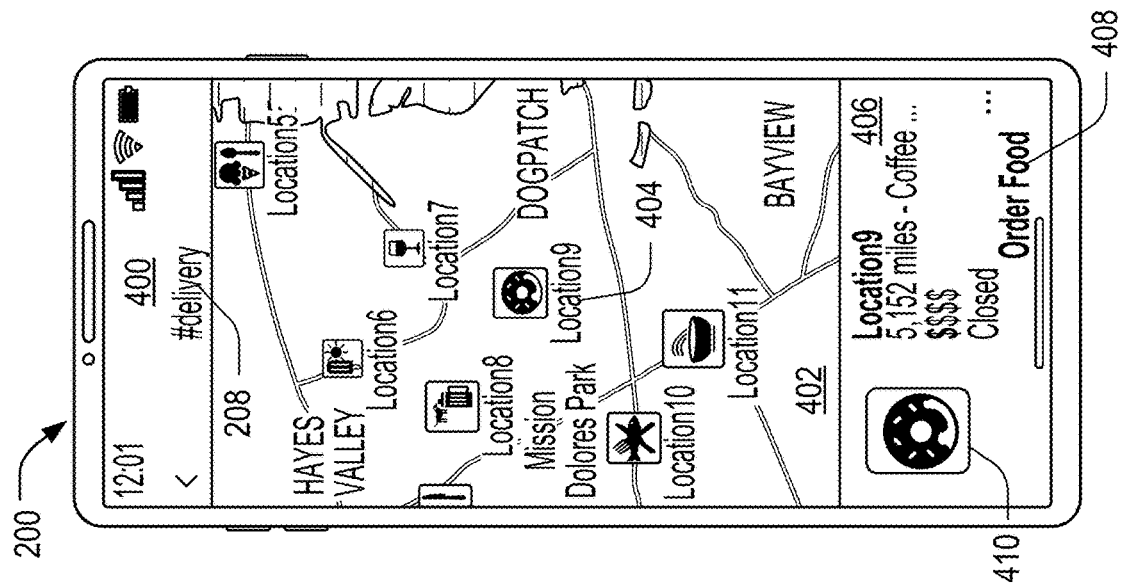

FIG. 4A illustrates the example device 200 including a user interface 400. Similar to FIG. 2, the user interface 400 includes the common feature 208 and an interactive map 402. The user interface 400 may include a number of feed posts (and/or thumbnails representing feed posts), such as a feed post 404 on the interactive map 402. The user interface 400 may also include a tab 406 that may provide details of the location tagged in the feed post 404. The tab 406 may be displayed in the user interface 400 in response to a selection of the feed post 404 on the interactive map 402. The tab 406 may include information such as a name of the establishment at the location tagged in the feed post 404, a distance from the example device 200 to the location tagged in the feed post 404, a type of goods and/or services offered at the establishment, a price of goods and/or services offered by the establishment, whether the establishment is open or closed, and the like. In some cases, the tab 406 may provide a control 408 that, when selected, provides the user with options to order food from the establishment at the location of the feed post 404. Additionally, in some examples, the tab 406 may include an image 410 from the feed post 404 shared by a user (e.g., the user 102(2)), shared by the business or establishment at the location tagged in the feed post, or the like.

FIG. 4B illustrates the example device 200 including a user interface 412. In some examples, the user interface 412 may be presented in response to a selection of the image 410 included in the tab 406 of the user interface 400. In some instances, the user interface 412 may include the original feed post that was used to populate the feed post 404 on the interactive map 402. Additionally or alternatively, the user interface 412 may include information included in the original feed post, such as a caption and/or a username of the user account that shared the feed post. The user interface 412 may also include comments on the feed post by users of the social networking system 106, and/or controls that, when selected, enable a user to like the feed post, comment on the feed post, save and/or bookmark the feed post, send the feed post as a direct message, follow the user account that shared the feed post, and the like.

FIG. 4C illustrates the example device 200 including a user interface 414. In some examples, the user interface 414 may be presented in response to a selection of a name of the establishment included in the user interface 400. In some examples, the user interface 414 may include an image 416 associated with the feed post 404, along with one or more other images 418 from other feed posts associated with the location included in the feed post 404. The other feed posts may have been shared on the social networking system 106 by different users than the user that shared the feed post 404. Therefore, the user 102(1) may view feed posts (e.g., by selecting one or more of the images 418) shared by users that the user 102(1) may not follow on the social networking system to obtain more information about the location in the feed post 404.

Figure 5:
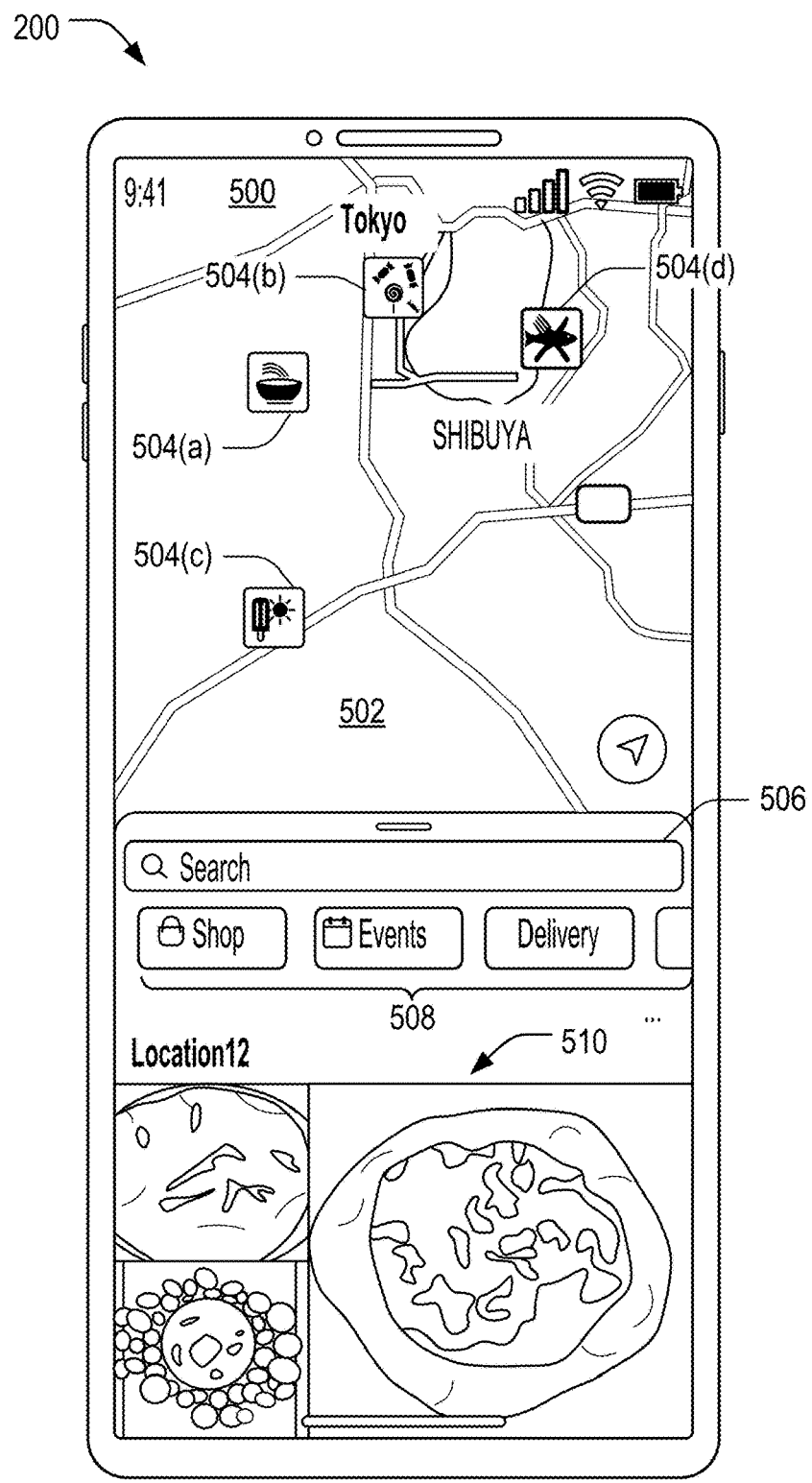
FIG. 5 illustrates an example user interface that is usable to present a social media map absent a text input from a user using the techniques described herein.

FIG. 5 illustrates the example device 200 including a user interface 500 displaying an interactive map 502 which may be presented absent a text input from the user 102(1). For example, a social network application installed on the device 200 and associated with the social networking system 106 may present the user interface 500 in response to selection of a map icon from a "home" screen, an "explore" page, or the like of the social network application, without entering a text input or other search term. The interactive map 502 may include a feed post 504(*a*), a feed post 504(*b*), a feed post 504(*c*), a feed post 504(*d*), and so on (collectively "feed posts 504").

In some examples, the map generation component 112 may populate the interactive map 502 with the feed posts 504 based on feed posts that have been shared by accounts that the user 102(1) follows on the social networking system 106 recently (e.g., within the past 1 day, within the past 2 days, within the past week, etc.), and/or feed posts 504 that are within a threshold distance (e.g. 1 mile, 5 miles, 10 miles, etc.) of the example device 200. In some cases, the feed posts 504 may be associated with different multi-author stories from one another, although examples are considered in which two or more of the feed posts 504 share one or more multi-author stories in common. However, because the user 102(1) in the present illustration has not entered a text input as a search term for a multi-author story in association with the user interface 500, the map generation component 112 has not narrowed the feed posts 504 to a desired location or category associated with a specific multi-author story.

In some examples, the user interface 500 may include a search bar 506. The user 102(1) may enter a text input in the search bar 506 to search for feed posts to populate the map, where the feed posts may be associated with a multi-author story related to the text input. In some cases, the user interface 500 may also include one or more selectable controls 508. The selectable controls 508 may provide suggestions of categories, that may, when selected, cause the map generation component 112 to populate the interactive map 502 with feed posts related to the category indicated in the selected selectable control. Additionally or alternatively, the user interface 500 may include one or more images 510 associated with a feed post that has been selected in the interactive map 502, as described above.

Figure 6:
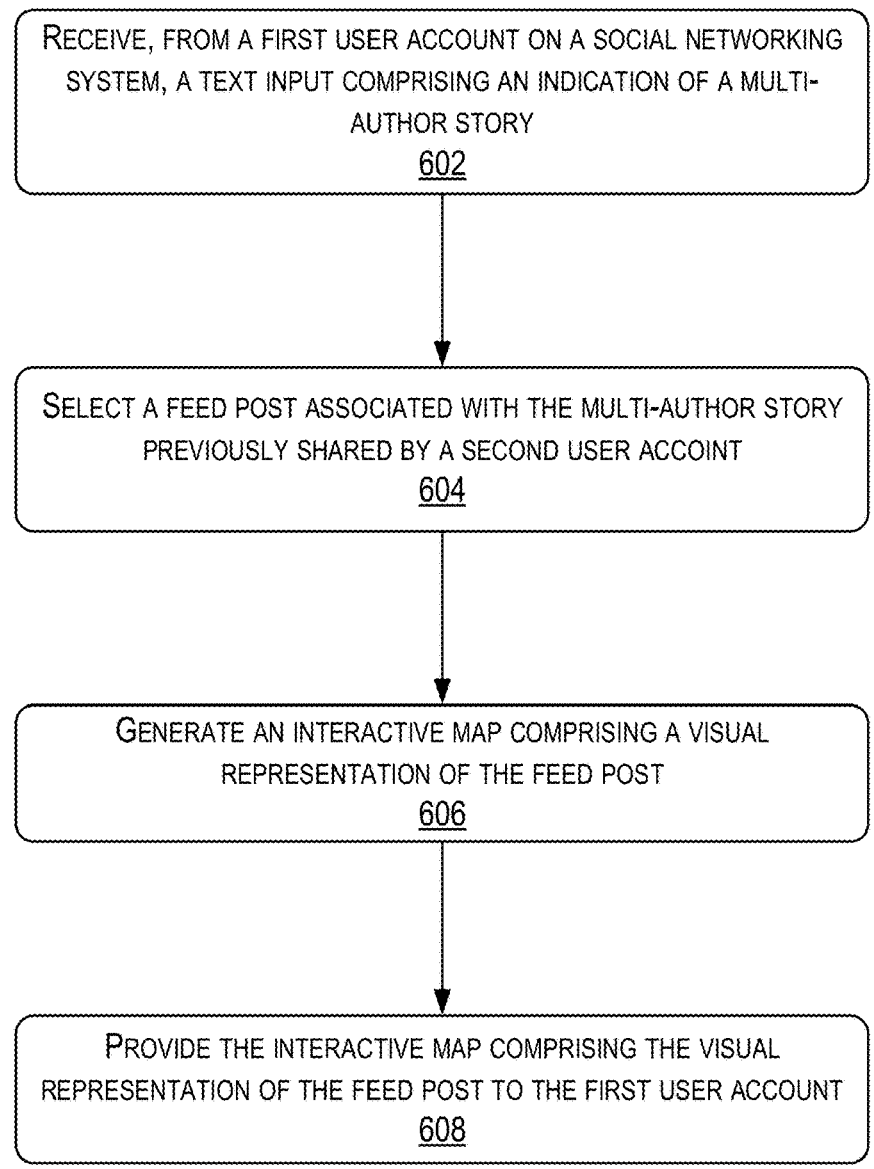
FIG. 6 illustrates a flowchart outlining an example method to generate social media maps using the techniques described herein.

FIG. 6 illustrates an example process 600 for generating a social networking map using the techniques described herein. The example process 600 is described with reference to the example system of FIG. 1 and/or the user interfaces of FIGS. 2-5 for convenience and ease of understanding. However, the example process 600 is not limited to being performed using the systems of FIG. 1 and/or FIG. 7, and/or the user interfaces of FIGS. 2-5 and may be implemented using systems and devices other than those described herein.

The process 600 described herein represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some examples, one or more operations of the process 600 may be omitted entirely. Moreover, the process 600 described herein can be combined in whole or in part with other methods.

An operation 602 includes receiving, from a first user account of a social networking system, a text input associated with a multi-author story. In some examples, the multi-author story may comprise content items (e.g., submitted by multiple user accounts) that have a common feature, such as a hashtag, sticker, location, or other indicator. In an illustrative example, the common feature may be "#delivery," where establishments that provide delivery services may include the common feature in content items shared on the social networking system 106. The social networking system 106 may include the content items that have the common "#delivery" feature together in a multi-author story. The first user account may provide "#delivery" when looking for establishments that provide delivery services. In this way, the common feature may allow the user to input a general category of goods or services, for example, without knowing the specific location they wish to visit.

An operation 604 includes selecting a feed post associated with the multi-author story previously shared by a second user account. In some examples, the feed post is persistent (e.g., non-ephemeral) and, once shared by the second user account, populates feeds of user accounts that follow the second user account on the social networking system. The social networking system 106 may select the feed post, in some examples, based on popularity and/or recency, where popularity may be based on the number of "likes" and/or comments the feed post has received, and recency may be based on the time and/or date that a feed post is shared. Continuing with the illustrative example with the "#delivery" input above, the social networking system 106 selects feed posts having the "#delivery" common feature included that have been shared by the second user account on the social networking system 106.

An operation 606 includes generating an interactive map comprising a visual representation of the feed post. In some examples, the interactive map may display the visual representation of the feed post at a tagged location associated with the feed post. In some cases, the interactive map may populate the map with a feed post that is shared by a second user account which the first user account follows on the social networking system. The feed post may, in some examples, include a common feature associated with a geolocation, where the geolocation may include the name of a specific location. The interactive map may display the entirety of the geolocation or a portion of the geolocation, in some examples. Additionally or alternatively, the text input may include a topic, such as a service, an attraction, or an item, to name a few examples, and the interactive map may display feed posts that are within a threshold distance of the first user and/or are within a region of the interactive map that is currently being displayed. Again referencing the illustrative example with the "#delivery" input above, the social networking system 106 may generate the interactive map with feed posts that include the common feature of "#delivery" and are within a threshold distance (e.g., 5 miles) of a device from which the search input was received from the first user account.

An operation 608 includes providing the interactive map comprising the visual representation to the first user account. In some cases, the interactive map allows the user to view the location of a device associated with the user account relative to the location tagged in the feed post, scroll on the map, zoom in, and zoom out, to name a few examples. Again referencing the illustrative example with the "#delivery" input above, the social networking system 106 may provide the interactive map including the feed posts that include the common feature of "#delivery" and are within the threshold distance of the device to the device from which the search input was received. In this way, the user may view establishments that have shared feed posts corresponding to the user's interests and that are within a threshold distance of the user.

In some examples, the interactive map may also include a tab that may provide details associated with the feed post.

For example, the tab may include information such as a name of the establishment tagged in the feed post, the distance from the device associated with the first user account to the location tagged in the feed post, types of goods/services offered at the establishment, and whether the establishment is open or closed, to name a few examples. In some examples, the tab may provide the user a selectable option to order goods or services from the establishment. Additionally or alternatively, the tab may include a selectable image from the feed post shared by a user. Upon selection of the image, the user may be presented with the original feed post that was used to populate the map, including comments by other users of the social networking system 106 and controls that, when selected, enable the user to like the feed post, comment on the feed post, save and/or bookmark the feed post, and the like. In this way, the user may explore the location associated with the feed post before, for example, visiting or ordering from the location.

Example System and Device

Figure 7:
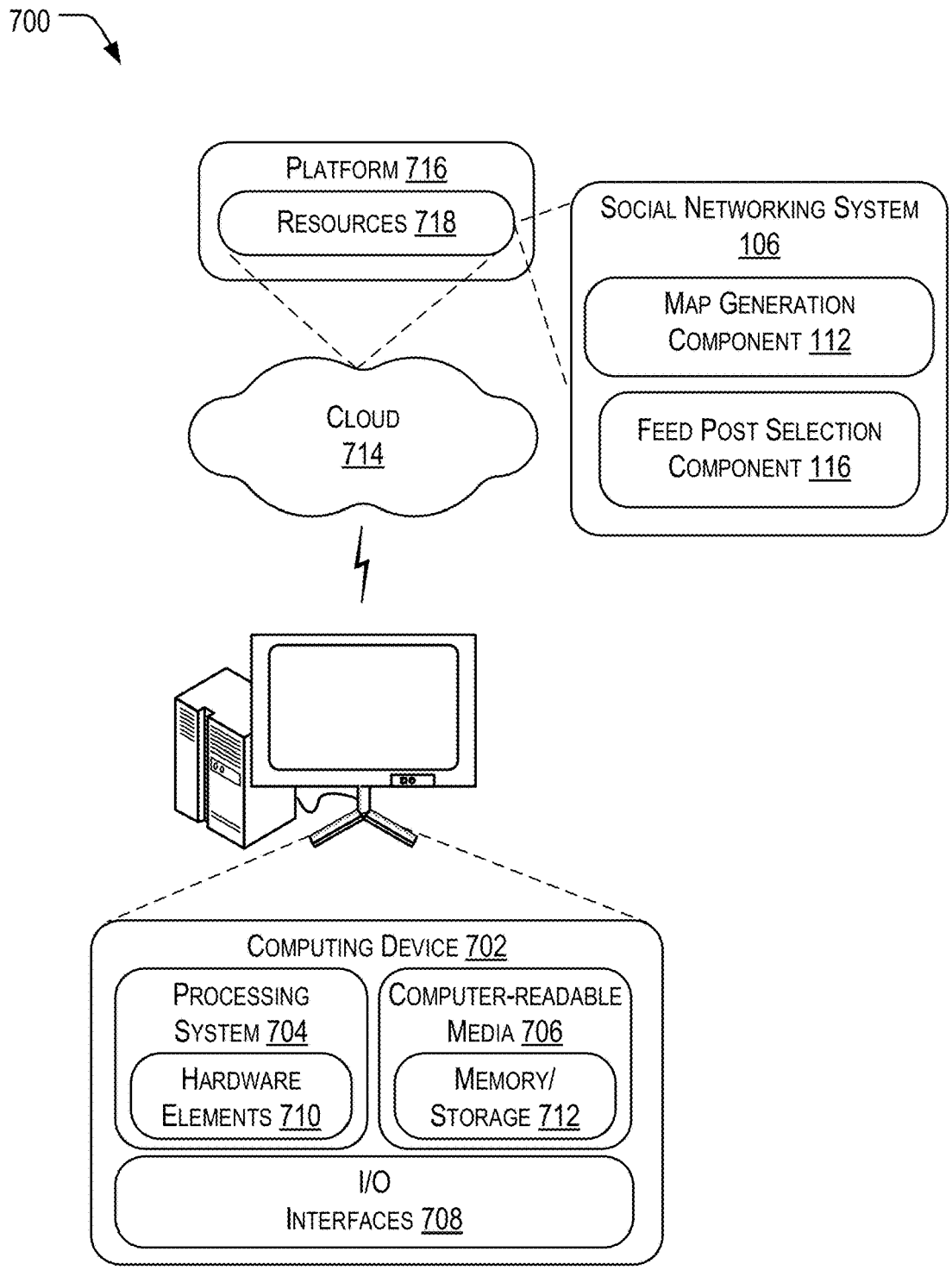
FIG. 7 is a schematic illustration of an example system and device usable to implement the techniques described herein.

FIG. 7 illustrates an example system generally at 700 that includes an example computing device 702 that is representative of one or more computing systems and/or devices that may implement the various techniques described herein. This is illustrated through inclusion of the map generation component 112 and the feed post selection component 116. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage component 712. The memory/storage component 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 702. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 702, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 710 and computer-readable media 706 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also be scalable to provide a corresponding level of scale to encountered demand for the resources 718 that are implemented via the platform 716. Accordingly, in an interconnected device embodiment, implementation of functionality described herein may be distributed throughout multiple devices of the system 700. For example, the functionality may be implemented in part on the computing device 702 as well as via the platform 716 which may represent a computing environment or cloud 714.

The example systems and methods of the present disclosure overcome various deficiencies of known prior art devices. Other embodiments of the present disclosure will be apparent to those skilled in the art from consideration of the specification and practice of the disclosure contained herein. It is intended that the specification and examples be considered as example only, with a true scope and spirit of the present disclosure being indicated by the following claims.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, from a first user account associated with a social networking system, a text input associated with a multi-author story as received text input, the multi-author story including content having a common feature from a plurality of features, the common feature including one or more of: a location, a topic, a hashtag, a category, a good, a service, a sticker, or another indicator;
selecting, as a selected feed post, a feed post associated with the common feature of the content of the multi-author story previously shared by a second user account;
generating an interactive map comprising the selected feed post; and
providing the interactive map comprising a visual representation of the selected feed post to the first user account, wherein the selected feed post is associated with the common feature of the content of the multi-author story.

2. The method of claim 1, further comprising:
determining that the received text input comprises a geolocation,
wherein generating the interactive map comprises displaying at least a portion of the geolocation on the interactive map.

3. The method of claim 1, further comprising:
determining that the received text input comprises a topic;
determining a location of a device associated with the first user account; and
determining that the selected feed post is within a threshold distance of the location;
wherein generating the interactive map is based at least in part on determining that the selected feed post is within the threshold distance and is associated with the topic.

4. The method of claim 1, wherein the selected feed post is a first selected feed post associated with the multi-author story, and wherein generating the interactive map including the visual representation of the first selected feed post comprises displaying a thumbnail of the first selected feed post, the method further comprising:
  receiving, from the first user account, a selection of the thumbnail; and
  displaying, based at least in part on the selection, the first selected feed post and a second feed post associated with the multi-author story.

5. The method of claim 4, wherein the first selected feed post and the second feed post are displayed in an order based on one or more of:
  a first popularity of the first selected feed post relative to a second popularity of the second feed post; or
  a recency that the first selected feed post was shared relative to the second feed post.

6. The method of claim 1, further comprising:
  determining that the first user account follows the second user account on the social networking system,
  wherein the selecting the feed post as the selected feed post is based at least in part on determining that the first user account follows the second user account on the social networking system.

7. The method of claim 1, wherein the received text input is a first received text input and the multi-author story is a first multi-author story, the method further comprising:
  receiving a second text input associated with a second multi-author story as a second received text input; and
  selecting a third feed post associated with the first multi-author story and the second multi-author story,
  wherein the first received text input is different from the second received text input, and
  wherein the first multi-author story is different from the second multi-author story.

8. One or more computer-readable storage media storing instructions that, when executed by one or more processors, perform operations comprising:
  determining that a first user account associated with a social networking system follows a second user account on the social networking system;
  selecting, as a selected feed post, a feed post associated with a multi-author story previously shared by the second user account, the multi-author story including content having a common feature from a plurality of features, the common feature including one or more of: a location, a topic, a hashtag, a category, a good, a service, a sticker, or another indicator;
  generating an interactive map comprising a visual representation of the selected feed post as a generated interactive map; and
  providing the generated interactive map comprising the visual representation of the selected feed post to the first user account, wherein the selected feed post is associated with the common feature of the content of the multi-author story.

9. The one or more computer-readable storage media of claim 8, wherein the selected feed post is one of multiple feed posts, the operations further comprising:
  generating a list of the multiple feed posts as a generated list of multiple feed posts; and
  providing the generated list of the multiple feed posts to the first user.

10. The one or more computer-readable storage media of claim 9, wherein the generated list of the multiple feed posts includes at least one of an hours of operation, a category of service provided, an open or closed status, and an average price.

11. The one or more computer-readable storage media of claim 8, the operations further comprising:
  determining a location of a device associated with the first user account; and
  determining that the selected feed post is within a threshold distance of the location;
  wherein generating the generated interactive map is based at least in part on determining that the selected feed post is within the threshold distance.

12. The one or more computer-readable storage media of claim 8, wherein the selected feed post is one of multiple feed posts, and wherein visual representations of the multiple feed posts are displayed on the generated interactive map based on one or more of:
  a popularity of individual ones of the multiple feed posts; and
  a recency that the individual ones of the multiple feed posts are shared.

13. The one or more computer-readable storage media of claim 8, wherein the selected feed post is a first selected feed post, and wherein generating the generated interactive map including the visual representation of the selected feed post comprises displaying a thumbnail representation of the first selected feed post, the operations further comprising:
  receiving a selection of the thumbnail representation from the first user account; and
  displaying, based at least in part on the selection, the first selected feed post and a second feed post associated with the multi-author story.

14. A system comprising:
  one or more processors; and
  one or more computer-readable media storing instructions that, when executed by the one or more processors, perform operations comprising:
    receiving, from a first user account associated with a social networking system, a text input associated with a multi-author story as received text input, the multi-author story including content having a common feature from a plurality of features, the common feature including one or more of: a location, a topic, a hashtag, a category, a good, a service, a sticker, or another indicator;
    selecting, as a selected feed post, a feed post associated with the common feature of the content of the multi-author story previously shared by a second user account;
    generating an interactive map comprising a visual representation of the selected feed post as a generated interactive map; and
    providing the generated interactive map comprising the visual representation of the selected feed post to the first user account, wherein the selected feed post is associated with the common feature of the content of the multi-author story.

15. The system of claim 14, the operations further comprising:
  determining that the received text input comprises a geolocation,
  wherein generating the generated interactive map comprises displaying at least a portion of the geolocation on the generated interactive map.

16. The system of claim 14, the operations further comprising:
  determining that the received text input comprises a topic;
  determining a location of a device associated with the first user account; and
  determining that the selected feed post is within a threshold distance of the location;

wherein generating the generated interactive map is based at least in part on determining that the selected feed post is within the threshold distance.

17. The system of claim 14, wherein the selected feed post is a first selected feed post associated with the multi-author story, and wherein generating the generated interactive map including the visual representation of the first selected feed post comprises displaying a thumbnail representation of the first selected feed post, the operations further comprising:
   receiving a selection of the thumbnail representation from the first user account; and
   displaying, based at least in part on the selection, the first selected feed post and a second feed post associated with the multi-author story.

18. The system of claim 14, wherein selecting the selected feed post is based on one or more of:
   a popularity of the feed post; and
   a recency that the feed post was shared.

19. The system of claim 14, the operations further comprising:
   determining that the first user account follows the second user account on the social networking system,
   wherein selecting the selected feed post is based at least in part on determining that the first user account follows the second user account on the social networking system.

20. The system of claim 14, wherein the received text input is a first received text input and the multi-author story is a first multi-author story, the operations further comprising:
   receiving a second text input associated with a second multi-author story; and
   determining that the selected feed post is associated with the first multi-author story and the second multi-author story;
   wherein selecting the selected feed post is based at least in part on determining that the selected feed post is associated with the first multi-author story and the second multi-author story,
   wherein the first text input is different from the second text input, and
   wherein the first multi-author story is different from the second multi-author story.

* * * * *